United States Patent
Hsiao et al.

(10) Patent No.: US 12,549,515 B2
(45) Date of Patent: Feb. 10, 2026

(54) COMPUTING SYSTEM WITH DYNAMIC FIREWALL MECHANISM AND ASSOCIATED METHOD

(71) Applicant: MEDIATEK INC., Hsin-Chu (TW)

(72) Inventors: Chih-Hsiang Hsiao, Hsinchu (TW);
Pei-Lun Suei, Hsinchu (TW); Yu-Chi Chu, Hsinchu (TW); Yingshiuan Pan, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 356 days.

(21) Appl. No.: 18/239,729

(22) Filed: Aug. 29, 2023

(65) Prior Publication Data

US 2024/0244034 A1 Jul. 18, 2024

Related U.S. Application Data

(60) Provisional application No. 63/439,277, filed on Jan. 17, 2023.

(51) Int. Cl.
*H04L 9/40* (2022.01)
*G06F 9/455* (2018.01)

(52) U.S. Cl.
CPC ...... *H04L 63/0209* (2013.01); *G06F 9/45558* (2013.01); *G06F 2009/45583* (2013.01); *G06F 2009/45587* (2013.01)

(58) Field of Classification Search
CPC ....... H04L 63/0209; G06F 2009/45583; G06F 2009/45587; G06F 9/45558; G06F 21/70; G06F 21/74; G06F 21/78; G06F 12/14; G06F 12/145; G06F 12/1483
See application file for complete search history.

(56) References Cited

U.S. PATENT DOCUMENTS

| | | | |
|---|---|---|---|
| 2013/0166848 A1* | 6/2013 | Miyazaki | G06F 12/0804 711/143 |
| 2016/0210465 A1* | 7/2016 | Craske | G06F 21/629 |
| 2017/0374026 A1* | 12/2017 | Martin | G06F 21/82 |
| 2018/0121125 A1 | 5/2018 | Zeng | |
| 2018/0129525 A1 | 5/2018 | Hong | |
| 2020/0125756 A1 | 4/2020 | Hampel | |
| 2022/0179677 A1* | 6/2022 | Hsiao | G06F 9/45558 |
| 2023/0015027 A1* | 1/2023 | Jaouen | G06F 9/5016 |
| 2023/0161484 A1* | 5/2023 | Pallardy | G06F 3/0655 711/163 |

FOREIGN PATENT DOCUMENTS

| | | | | | |
|---|---|---|---|---|---|
| CN | 115309678 A | * | 11/2022 | | G06F 13/28 |
| DE | 102024201671 A1 | * | 8/2025 | | |
| EP | 4086763 A1 | * | 11/2022 | | G06F 9/45558 |
| TW | 201905719 A | | 2/2019 | | |
| TW | 202008169 A | | 2/2020 | | |
| TW | 202223664 A | | 6/2022 | | |

* cited by examiner

*Primary Examiner* — Kostas J Katsikis
(74) *Attorney, Agent, or Firm* — Winston Hsu

(57) ABSTRACT

A computing system includes a memory, an MPU, and a processor. The MPU is arranged to: receive permission information of the memory; and perform a protection operation through a dynamic firewall. The processor is arranged to execute a root manager and a hypervisor. The root manager is arranged to provide the permission information to the MPU. The hypervisor is arranged to: receive the permission information from the MPU; set the dynamic firewall according to the permission information; and provide the dynamic firewall to the MPU.

20 Claims, 4 Drawing Sheets

COMPUTING SYSTEM WITH DYNAMIC FIREWALL MECHANISM AND ASSOCIATED METHOD

CROSS REFERENCE TO RELATED APPLICATIONS

This application claims the benefit of U.S. Provisional Application No. 63/439,277, filed on Jan. 17, 2023. The content of the application is incorporated herein by reference.

BACKGROUND

The present invention is related to virtualization-based system security issues, and more particularly, to a computing system with a dynamic firewall mechanism that can block possible attacks on a memory management unit (MMU) and a system MMU (SMMU) from affecting virtual machines (VMs) and devices for high privilege protection.

For system security issues of Android's high-level operating system (OS) that uses a monolithic OS (e.g. a Linux) as a kernel, virtualization has gradually become a trend. A hypervisor in a computing system running the OS may enable multiple VMs to run in parallel and dynamically allocate resources to the VMs. The hypervisor typically utilizes an MMU to perform a virtualization operation and an isolation operation upon the VMs, and more particularly, to perform a logical to physical address translation and a protection operation upon the VMs. In addition, the hypervisor typically utilizes an SMMU to perform a virtualization operation and an isolation operation upon multiple devices in the computing system, and more particularly, to perform a logical to physical address translation and a protection operation upon the devices. Some problems may occur, however. The MMU and the SMMU in the computing system are vulnerable to attacks, which may affect the security issues of the VMs and the devices. As a result, a novel computing system with higher privilege protection of the VMs and the devices is urgently needed.

SUMMARY

It is therefore one of the objectives of the present invention to provide a computing system with a dynamic firewall mechanism that can block possible attacks on an MMU and an SMMU from affecting VMs and devices for high privilege protection, to address the above-mentioned issues.

According to an embodiment of the present invention, a computing system is provided. The computing system comprises a memory, a memory protection unit (MPU), and a processor. The MPU is arranged to: receive permission information of the memory; and perform a protection operation through a dynamic firewall. The processor is arranged to execute a root manager and a hypervisor. The root manager is arranged to provide the permission information to the MPU. The hypervisor is arranged to: receive the permission information from the MPU; set the dynamic firewall according to the permission information; and provide the dynamic firewall to the MPU.

According to an embodiment of the present invention, a method for performing a protection operation through a dynamic firewall is provided. The method comprises: receiving, by a memory protection unit (MPU), permission information of a memory from a root manager; receiving, by a hypervisor, the permission information from the MPU; setting, by the hypervisor, the dynamic firewall according to the permission information; providing, by the hypervisor, the dynamic firewall to the MPU; and performing, by the MPU, the protection operation through the dynamic firewall.

One of the benefits of the present invention is that, by setting a static firewall and a dynamic firewall in a configuration between an MPU and a hypervisor, a higher privilege protection can be provided to VMs and devices, which can block possible attacks on an MMU and the MPU from affecting the VMs and the devices.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
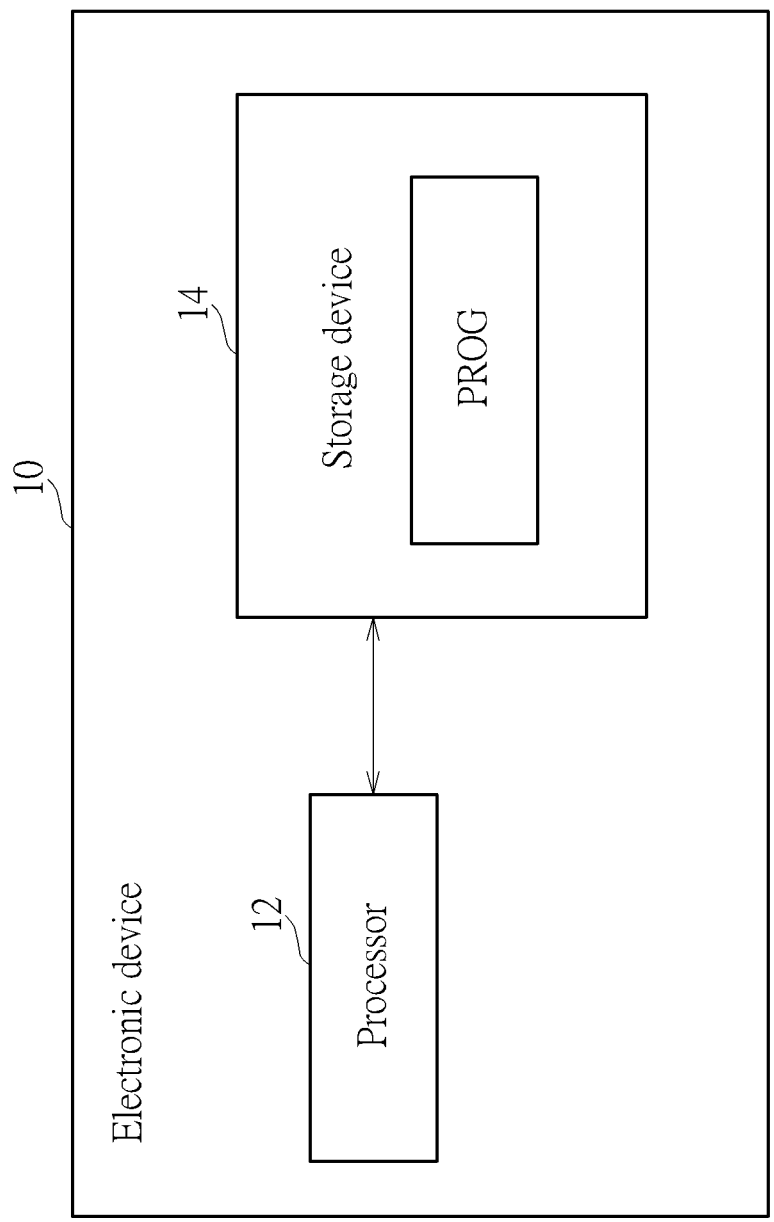
FIG. 1 is a diagram illustrating an electronic device according to an embodiment of the present invention.

FIG. 1 is a diagram illustrating an electronic device 10 according to an embodiment of the present invention. By way of example, but not limitation, the electronic device 10 may be a portable device such as a smartphone or a tablet. The electronic device 10 may include a processor 12 and a storage device 14. The processor 12 may be a single-core processor or a multi-core processor. The storage device 14 is a non-transitory machine-readable medium, and is arranged to store computer program code PROG. The processor 12 is equipped with software execution capability. The computer program code PROG may include a plurality of software modules. As a result, when loaded and executed by the processor 12, the computer program code PROG instructs the processor 12 to perform designated functions of the software modules. The electronic device 10 may be regarded as a computer system using a computer program product that includes a computer-readable medium containing the computer program code PROG. Regarding a computing system with a dynamic firewall mechanism as proposed by the present invention, it may be embodied on the electronic device 10. For example, the computing system with the dynamic firewall mechanism may include software-based functions implemented by the computer program code PROG running on the processor 12.

Figure 2:
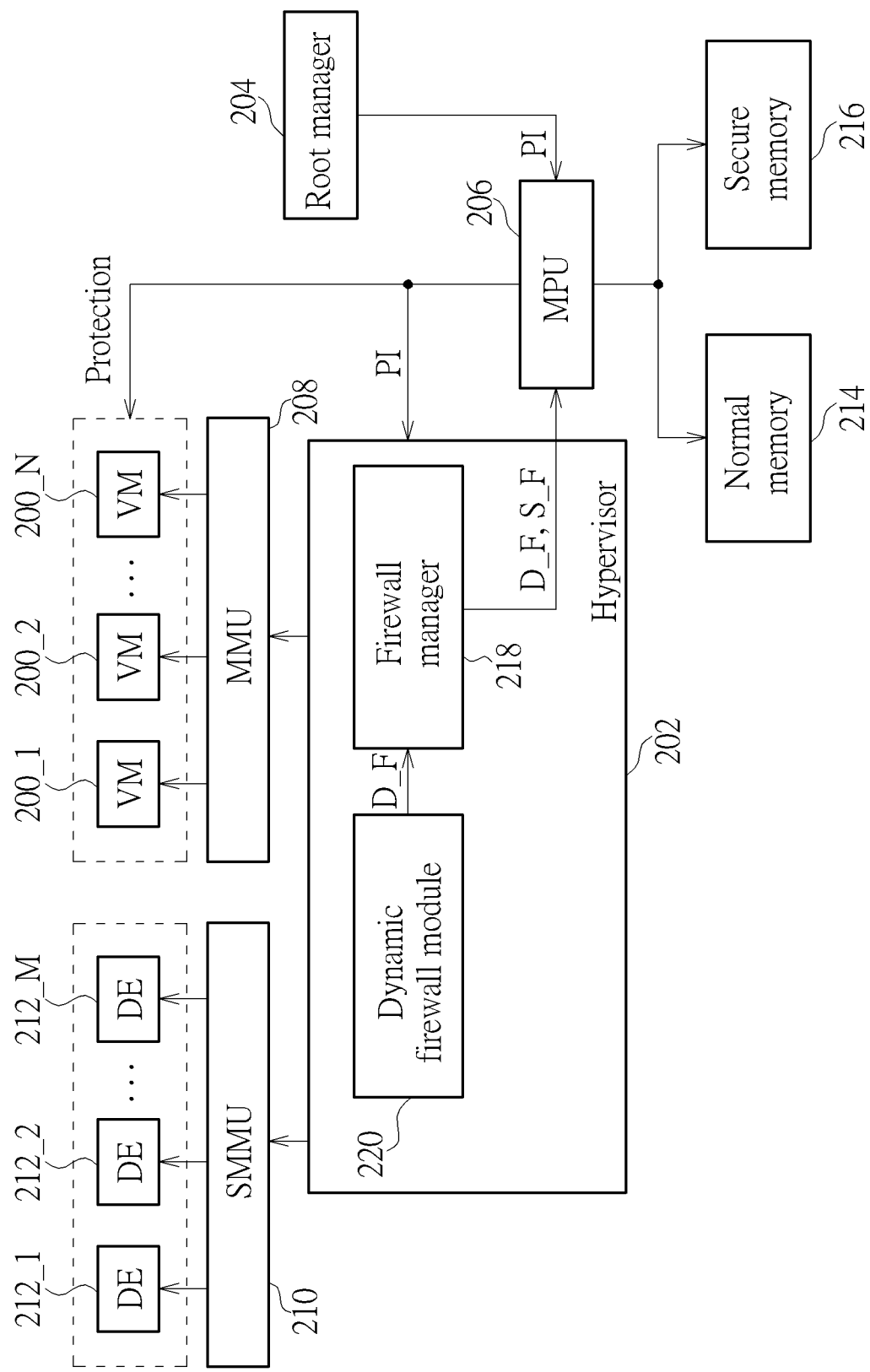
FIG. 2 is a diagram illustrating a computing system with a dynamic firewall mechanism according to an embodiment of the present invention.

FIG. 2 is a diagram illustrating a computing system 20 with a dynamic firewall mechanism according to an embodiment of the present invention. As shown in FIG. 2, the computing system 20 may include a processor (e.g. the processor 12 shown in FIG. 1). The processor may be arranged to execute software modules, including multiple virtual machines (VMs) 200_1-200_N, a hypervisor 202, and a root manager 204, wherein N is an integer greater than 1 (i.e. N>1). In addition, the computing system 20 may further include a memory protection unit (MPU) 206, a memory management unit (MMU) 208, a system MMU (SMMU) 210, multiple devices 212_1-212_M, a normal memory 214 and a secure memory 216, wherein M is an integer greater than 1 (i.e. M>1). In order to increase security of the VMs 200_1-200_N, the root manager 204 may be arranged to provide permission information PI to the MPU 206. For example, the permission information PI may indicate that which VM in the VMs 200_1-200_N has permission to access a specific physical address range of the secure memory 216.

The hypervisor 202 may be arranged to set the MMU 208 so that the MMU 208 may perform a virtualization operation upon the VMs 200_1-200_N, and more particularly, may perform a logical to physical address translation upon the VMs 200_1-200_N. In addition, the MMU 208 may perform an isolation operation upon the VMs 200_1-200_N, so that the VMs 200_1-200_N may be isolated from each other for security. In order to provide higher privilege protection for the VMs 200_1-200_N, the hypervisor 202 may be further arranged to receive the permission information PI from the MPU 206, and set a dynamic firewall D_F according to the permission information PI. Specifically, the hypervisor 202 may include a firewall manager 218 and a dynamic firewall module 220. At an initialization stage of the hypervisor 202, the firewall manager 218 may be arranged to control the MPU 206 to set a static firewall S_F, and the MPU 206 may be arranged to perform a protection operation upon the VMs 200_1-200_N through the static firewall S_F. After the initialization stage of the hypervisor 202 (i.e. during a runtime of the hypervisor 202), the dynamic firewall module 220 may be arranged to adjust a protection range of the dynamic firewall D_F according to the permission information PI, and then provide the dynamic firewall D_F to the MPU 206 through the firewall manager 218, so that the MPU 206 may perform the protection operation upon the VMs 200_1-200_N through the dynamic firewall D_F.

Compared with a case where the VMs 200_1-200_N is protected only by the isolation operation performed by an MMU, by setting the static firewall S_F and the dynamic firewall D_F, attacks from the MMU 208 will not impact the VMs 200_1-200_N, which makes the computing system 20 (more particularly, the hypervisor 202 and the MPU 206) provide a higher privilege protection for the VMs 200_1-200_N.

In addition, the hypervisor 202 may be arranged to set the SMMU 210 so that the SMMU 210 may perform a virtualization operation upon the devices 212_1-212_M, and more particularly, may perform a logical to physical address translation upon the devices 212_1-212_M. In addition, the SMMU 210 may perform an isolation operation upon the devices 212_1-212_M, so that the devices 212_1-212_M may be isolated from each other for security. In order to provide higher privilege protection for the devices 212_1-212_M, the hypervisor 220 may further include another firewall manager for the devices 212_1-212_M, and another MPU may be utilized to perform associated processing.

Figure 3:
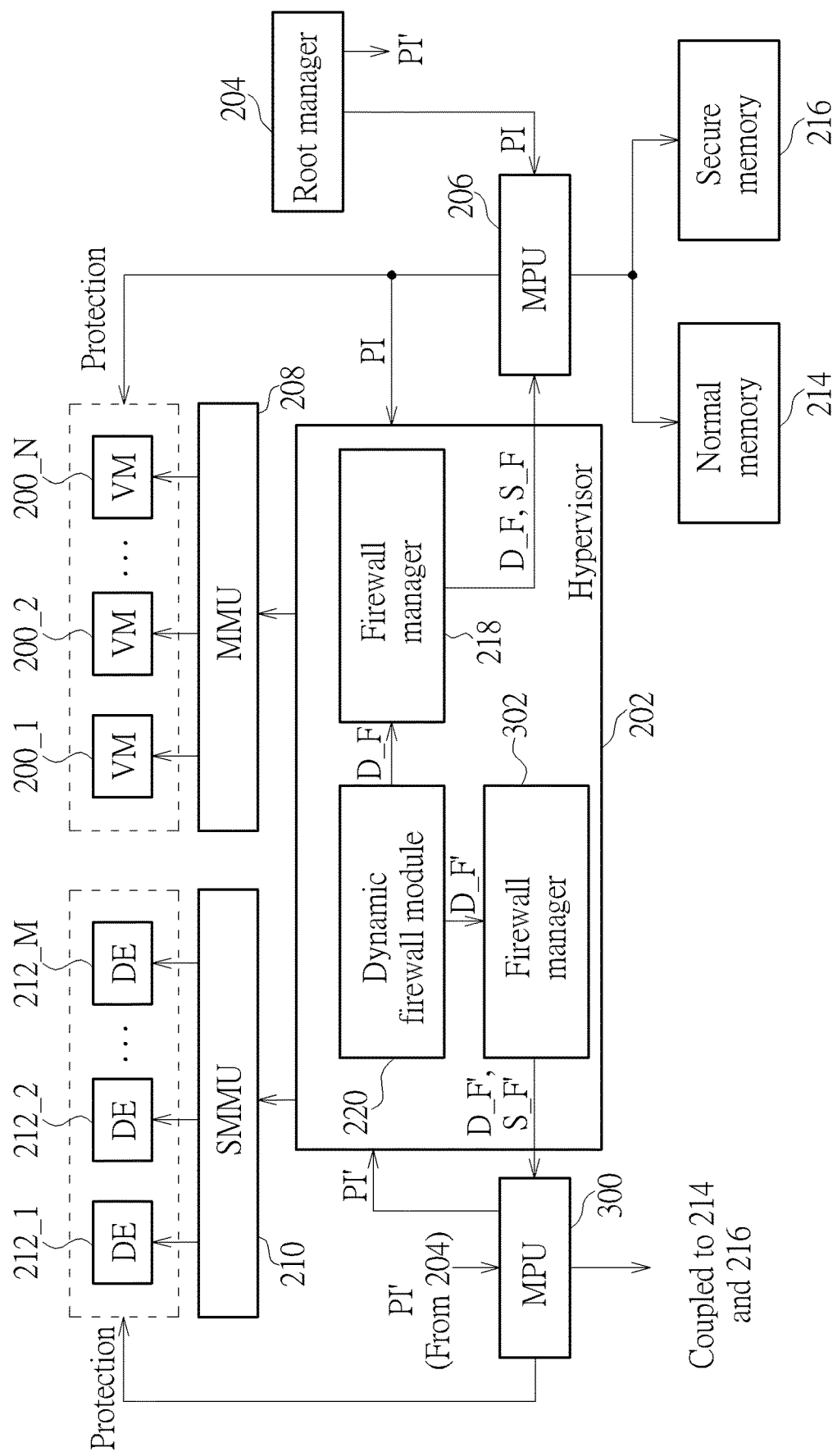
FIG. 3 is a diagram illustrating a computing system with a dynamic firewall mechanism according to another embodiment of the present invention.

Please refer to FIG. 3. FIG. 3 is a diagram illustrating a computing system 30 with a dynamic firewall mechanism according to another embodiment of the present invention. The difference between the computing system 20 shown in FIG. 2 and the computing system 30 is that the computing system 30 may further include an MPU 300 and a firewall manager 302 included in the hypervisor 202. The MPU 300 may be arranged to receive permission information PI' from the root manager 204. For example, the permission information PI' may indicate that which device in the devices 212_1-212_M has permission to access a specific physical address range of the secure memory 216.

The hypervisor 202 may be arranged to receive the permission information PI' from the MPU 300, and set a dynamic firewall D_F' according to the permission information PI'. Specifically, at an initialization stage of the hypervisor 202, the firewall manager 302 included in the hypervisor 202 may be arranged to control the MPU 300 to set a static firewall S_F', and the MPU 300 may be arranged to perform a protection operation upon the devices 212_1-212_M through the static firewall S_F'. After the initialization stage of the hypervisor 202 (i.e. during a runtime of the hypervisor 202), the dynamic firewall module 220 may be arranged to adjust a protection range of the dynamic firewall D_F' according to the permission information PI', and then provide the dynamic firewall D_F' to the MPU 300 through the firewall manager 302, so that the MPU 300 may perform the protection operation upon the devices 212_1-212_M through the dynamic firewall D_F'. Compared with a case where the devices 212_1-212_M is protected only by the isolation operation performed by an SMMU, by setting the static firewall S_F' and the dynamic firewall D_F', attacks from the SMMU 210 will not impact the devices 212_1-212_M, which makes the computing system 30 (more particularly, the hypervisor 202 and the MPU 300) provide a higher privilege protection for the devices 212_1-212_M.

Figure 4:
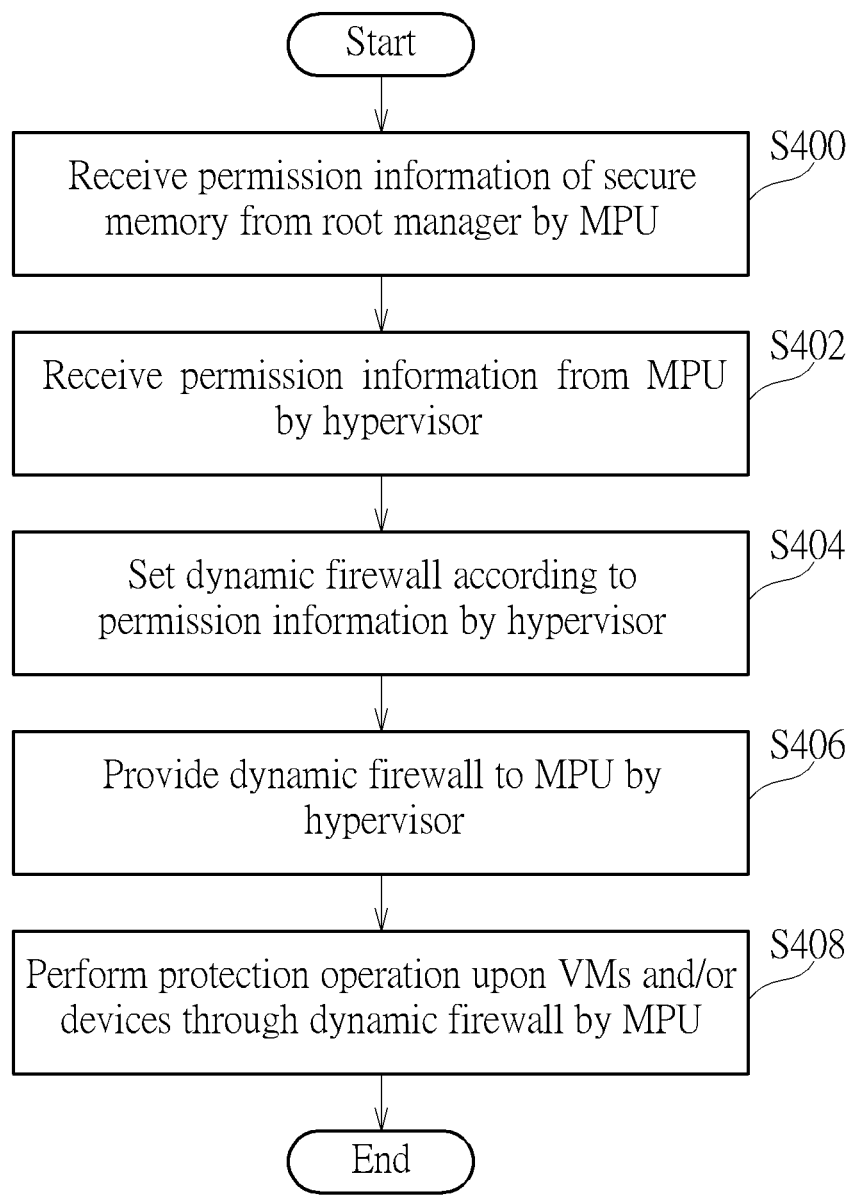
FIG. 4 is a flow chart of a method for performing a protection operation through a dynamic firewall according to an embodiment of the present invention.

FIG. 4 is a flow chart of a method for performing a protection operation through a dynamic firewall according to an embodiment of the present invention. Provided that the result is substantially the same, the steps are not required to be executed in the exact order shown in FIG. 4. For example, the method shown in FIG. 4 may be employed by the computing system 20 shown in FIG. 2 or the computing system 30 shown in FIG. 3.

In Step S400, permission information PI/PI' of the secure memory 216 is received from the root manager 204 by the MPU 206/300.

In Step S402, the permission information PI/PI' is received from the MPU 206/300 by the hypervisor 202.

In Step S404, the dynamic firewall D_F/D_F' is set according to the permission information PI/PI' by the hypervisor 202.

In Step S406, the dynamic firewall D_F/D_F' is provided to the MPU 206/300 by the hypervisor 202.

In Step S408, the protection operation is performed upon the VMs 200_1-200_N and/or the devices 212_1-212_M through the dynamic firewall D_F/D_F' by the MPU 206/300.

Since a person skilled in the pertinent art can readily understand details of the steps after reading above paragraphs directed to the computing system 20 shown in FIG. 2 or the computing system 30 shown in FIG. 3, further descriptions are omitted here for brevity.

In summary, by setting a static firewall and a dynamic firewall in a configuration between an MPU and a hypervisor, higher privilege protection can be provided to VMs and devices, which can block possible attacks on an MMU and the MPU from affecting the VMs and the devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A computing system, comprising:
   a memory;
   a memory protection unit (MPU), arranged to:
     receive permission information of the memory; and
     perform a protection operation through a dynamic firewall; and
   a processor, arranged to execute:
     a root manager, arranged to provide the permission information to the MPU; and
     a hypervisor, arranged to:
       receive the permission information from the MPU;
       set the dynamic firewall according to the permission information; and
       provide the dynamic firewall to the MPU.

2. The computing system of claim 1, wherein the processor is further arranged to execute at least one virtual machine (VM), and the computing system further comprises:
   a memory management unit (MMU), arranged to perform a virtualization operation and an isolation operation upon the at least one VM.

3. The computing system of claim 2, wherein the permission information indicates that which VM in the at least one VM has permission to access a specific address range of the memory.

4. The computing system of claim 2, wherein at an initialization stage of the hypervisor, the hypervisor is further arranged to control the MPU to set a static firewall, and the MPU is arranged to perform the protection operation upon the at least one VM through the static firewall.

5. The computing system of claim 4, wherein after the initialization stage of the hypervisor, the hypervisor is arranged to provide the dynamic firewall to the MPU, and the MPU is arranged to perform the protection operation upon the at least one VM through the dynamic firewall.

6. The computing system of claim 1, wherein the computing system further comprises at least one device and a system memory management unit (SMMU), and the SMMU is arranged to perform a virtualization operation and an isolation operation upon the at least one device.

7. The computing system of claim 6, wherein the permission information indicates that which device in the at least one device has permission to access a specific address range of the memory.

8. The computing system of claim 6, wherein at an initialization stage of the hypervisor, the hypervisor is further arranged to control the MPU to set a static firewall, and the MPU is arranged to perform the protection operation upon the at least one device through the static firewall.

9. The computing system of claim 8, wherein after the initialization stage of the hypervisor, the hypervisor is arranged to provide the dynamic firewall to the MPU, and the MPU is arranged to perform the protection operation upon the at least one device through the dynamic firewall.

10. The computing system of claim 1, wherein the hypervisor is further arranged to adjust a protection range of the dynamic firewall according to the permission information.

11. A method for performing a protection operation through a dynamic firewall, comprising:
    receiving, by a memory protection unit (MPU), permission information of a memory from a root manager;
    receiving, by a hypervisor, the permission information from the MPU;
    setting, by the hypervisor, the dynamic firewall according to the permission information;
    providing, by the hypervisor, the dynamic firewall to the MPU; and
    performing, by the MPU, the protection operation through the dynamic firewall.

12. The method of claim 11, further comprising:
    performing, by a memory management unit (MMU), a virtualization operation and an isolation operation upon at least one virtual machine (VM).

13. The method of claim 12, wherein the permission information indicates that which VM in the at least one VM has permission to access a specific address range of the memory.

14. The method of claim 12, further comprising:
    at an initialization stage of the hypervisor, controlling, by the hypervisor, the MPU to set a static firewall; and
    performing, by the MPU, the protection operation upon the at least one VM through the static firewall.

15. The method of claim 14, further comprising:
    after the initialization stage of the hypervisor, providing, by the hypervisor, the dynamic firewall to the MPU; and
    performing, by the MPU, the protection operation upon the at least one VM through the dynamic firewall.

16. The method of claim 11, further comprising:
    performing, by memory management unit (MMU), a virtualization operation and an isolation operation upon at least one device.

17. The method of claim 16, wherein the permission information indicates that which device in the at least one device has permission to access a specific address range of the memory.

18. The method of claim 16, further comprising:
    at an initialization stage of the hypervisor, controlling, by the hypervisor, the MPU to set a static firewall; and
    performing, by the MPU, the protection operation upon the at least one device through the static firewall.

19. The method of claim 18, further comprising:
    after the initialization stage of the hypervisor, providing, by the hypervisor, the dynamic firewall to the MPU; and
    performing, by the MPU, the protection operation upon the at least one device through the dynamic firewall.

20. The method of claim 11, further comprising:
    adjusting, by the hypervisor, a protection range of the dynamic firewall according to the permission information.

* * * * *